Nov. 1, 1932. F. J. O'CONNOR 1,885,282
ADVERTISING SIGN FOR A VEHICLE TOP
Filed Sept. 5, 1931 2 Sheets-Sheet 1
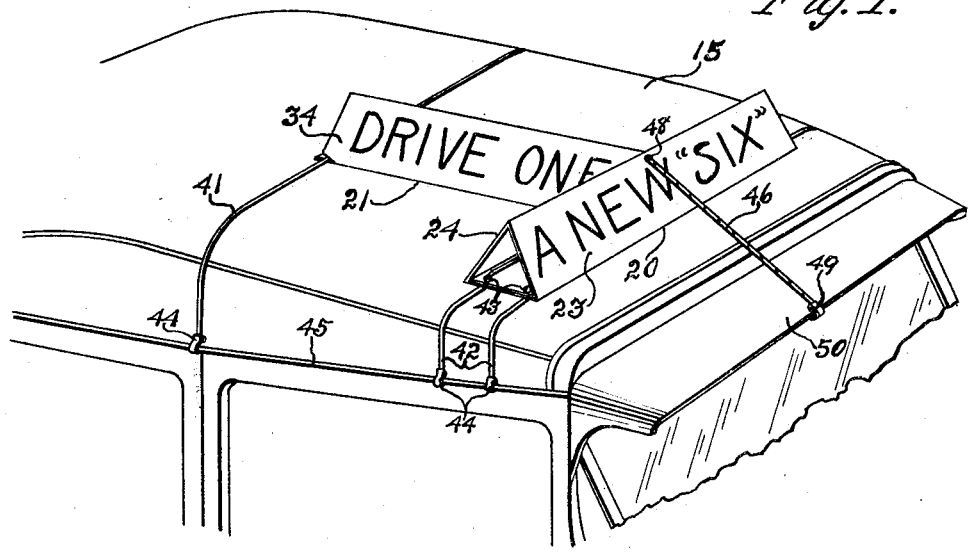
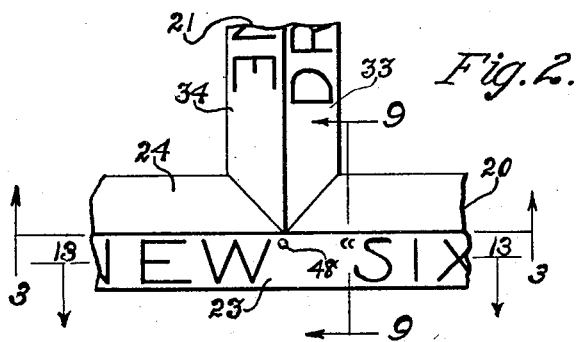
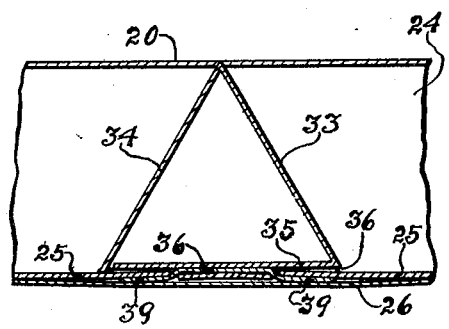
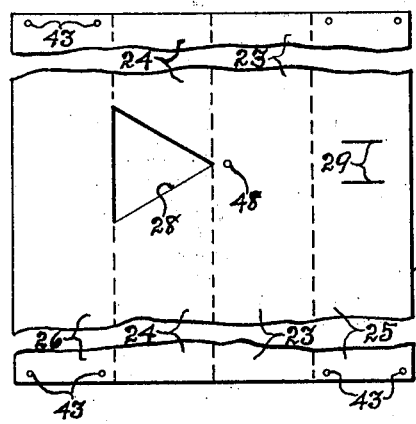
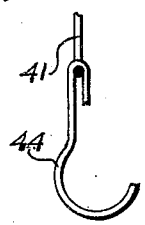
Inventor
Frank J. O'Connor
By Luther Johns
Att'y Nov. 1, 1932.   F. J. O'CONNOR   1,885,282
ADVERTISING SIGN FOR A VEHICLE TOP
Filed Sept. 5, 1931   2 Sheets-Sheet 2
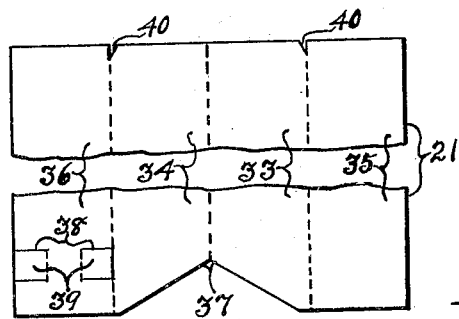
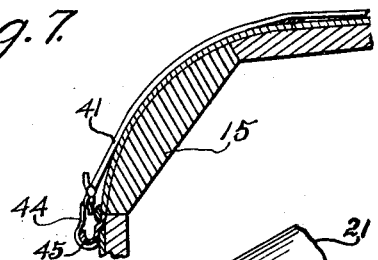
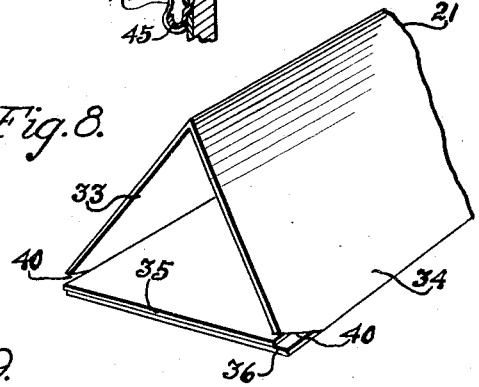
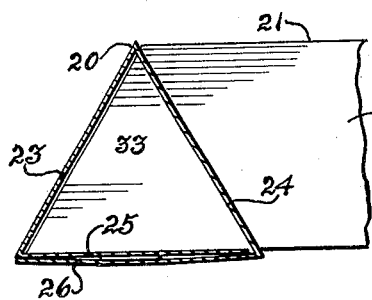
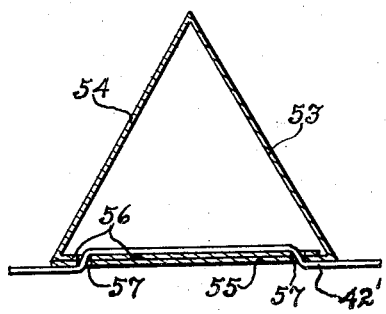
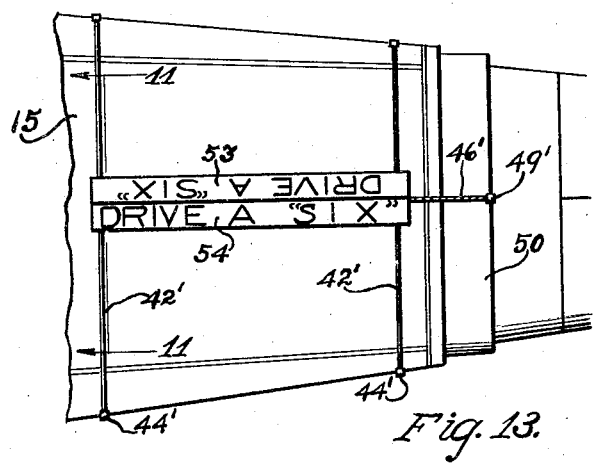
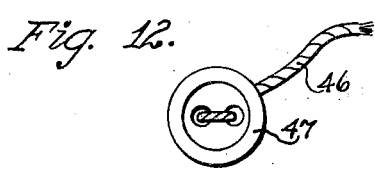
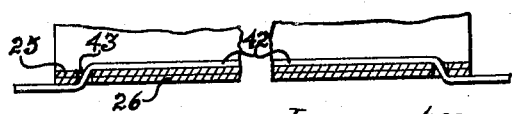
Inventor
Frank J. O'Connor
By Luther Johns
Att'y Patented Nov. 1, 1932

1,885,282

UNITED STATES PATENT OFFICE

FRANK J. O'CONNOR, OF DWIGHT, ILLINOIS

ADVERTISING SIGN FOR A VEHICLE TOP

Application filed September 5, 1931. Serial No. 561,334.

This invention relates to an advertising sign for a vehicle top.

One of the objects of this invention is to provide an efficient advertising sign which can be readily mounted and conveniently adjusted in position on the top of a vehicle, especially an automobile, and which can be readily removed therefrom.

Another object is to provide such a sign which can be readily made and set up for use and which can easily be folded up for storing and shipping.

A further object is to provide a highly efficient sign of the character described which can be manufactured at small cost.

These and other objects and advantages are attained with this invention, as will become apparent from the following description taken in connection with the accompanying drawings, in which the invention is shown in its preferred form, it being understood that other arrangements and forms of construction may be resorted to for carrying out the invention.

In the drawings:

Fig. 1 is a perspective view showing one form of my invention applied to the top of a motor vehicle.

Fig. 2 is a fragmentary plan view of the connecting portion of the two branches of this form of sign.

Fig. 3 is a vertical sectional view, taken along line 3—3 of Fig. 2.

Figs. 4 and 6 are fragmentary views of the stamped sheets of material which provide the two connected branches forming this sign.

Fig. 5 is a view of the hook used to attach the securing bands to the vehicle top.

Fig. 7 is a vertical sectional view of the securing means attached to the vehicle top.

Fig. 8 shows the notched rear end part of the sign for receiving the securing band.

Fig. 9 is a vertical sectional view taken along line 9—9 of Fig. 2.

Fig. 10 is a plan view of a slightly modified form of this invention and which consists of a single member, mounted longitudinally of the automobile top.

Fig. 11 is a vertical sectional view thereof, taken along line 11—11 of Fig. 10.

Fig. 12 illustrates the cord and button used for securing the sign to the front of the vehicle top.

Fig. 13 is an enlarged fragmentary sectional view, taken along line 13—13 of Fig. 2, showing the manner of lacing the securing band through the bottom elements of the sign.

My improved sign is so constructed as to be adapted to be mounted on the top 15 of an automobile or similar vehicle and to be used for advertising purposes. It includes a hollow elongated body containing a plurality of elongated panels or walls, this body being preferably triangular in cross-section, and having the advertising matter placed on several exposed upstanding panels. It is of sheet material, preferably cardboard or composition provided with a rainproof exterior, as by dipping it in paraffin or the like, or by applying a rainproof coating over the exterior surface of the panels, thus providing a lightweight and low-cost sign.

This body may be constructed in various forms; for example, it may include two connected branches or members arranged in the form of a T, as shown in Figs. 1 to 9 of the drawings; or it may be provided in the form of a single straight member, as shown in Figs. 10 and 11. In either form the sign is constructed to be set up readily and is provided with means for mounting it readily in proper position on the vehicle top 15.

The T-shaped form shown in Fig. 1 includes a front branch or head 20 mounted to extend crosswise of the vehicle top, and a rear branch 21 extending from the middle part thereof rearwardly over such top, each branch being formed from a sheet of material scored to be folded into the desired shape, substantially as shown in the drawings. The forward branch 20 includes a front panel 23 and a rear panel 24 hinged together at the contiguous edges by the scoring and forming the upstanding panels to bear the advertising matter, said panels carrying on their lower edges respectively an inner bottom panel 25 and a lower bottom panel 26 (see Figs. 1, 4 and 9), said panels 25 and 26 being foldable against panels 23 and 24 in collapsing the sign. Panel 24 is provided with a triangular opening 28 for receiving the front end of branch 21 therein, and panel 25 is provided with slits 29, as best shown in Fig. 4, and which are adapted to coact with holding elements on the rearwardly-extending sign member.

The rear branch 21 (see Figs. 3, 6 and 8) comprises two side members or panels 33 and 34 hinged together by scoring at the contiguous edges and forming the exposed panels to bear laterally advertising matter and being provided at their lower edges respectively with an upper bottom flap or panel 35 and a lower bottom flap or panel 36. The side panels 33 and 34 have a notch 37 provided at their junction in front (see Fig. 6), to fit the front panel 23 of the front branch 20, said branch 21 having its front end inserted through the triangular opening 28 in rear panel 24 of the front branch. The bottom panel 36 of this member 21 is slitted along lines 38 to provide lips 39 which are bent downwardly and are entered in the slits 29 in panel 25 of branch 20, as best shown in Fig. 3. Notches 40 are provided at the rear end of member 21 to receive securing means therein.

The means for securing the sign on the top of the vehicle comprises a rear band 41 which is placed in the notches 40 and bears upon bottom panels 35 and 36; also a pair of bands 42 which are laced through openings 43 provided in panels 25 and 26 so as to register when the panels are placed in operative position. Hooks 44 are detachably secured at the ends of bands 41 and 42, and are conveniently hooked over the drain trough 45 at the side edge of top 15 so as to be securely held in position thereon. These bands are flexible and preferably of elastic material, whereby the bands may be extended and the hooks may be readily released from member 45, and whereby the sign will be clamped firmly in position on the top 15. A band or cord 46 is provided with a button-like holding element 47 at one end, the cord 46 extending through an opening 48 in panel 23 and said button-like element engaging the inner side of panel 23 so that the band may be readily attached to or detached from the sign. A hook 49 is attached to the forward end of cord or band 46 whereby the band is readily secured to the sunvisor 50, to prevent rearward slipping of the sign.

This sign may be readily mounted on the vehicle top and readily adjusted into proper position at the middle of the top, by sliding it along the securing bands 41 and 42 laterally of the top. The branches 20 and 21 are readily joined by merely inserting branch 21 in opening 28 and inserting lips 39 in slits 29, said lips being then held firmly in position between the bottom flaps or panels 25 and 26; and the branches are also readily separated by withdrawing said lips; likewise the branches may readily be folded flat for convenient shipment and storing thereof by withdrawing the bands 41 and 42, or by folding the panels with the flexible bands loosened therein. These branches are thus readily formed and readily mounted and adjusted in proper position on the top of the vehicle, and are also readily removed therefrom to be folded away.

The form of sign shown in Figs. 10 and 11 comprises a single body consisting of the top panels 53 and 54 having respectively at the lower ends thereof the lower bottom panel 55 and the inner or upper bottom panel 56 and which are overlapped and provided with registering openings 57 wherethrough the securing bands 42' are laced, one at the front and one at the rear of this member, and extend laterally of the automobile top 15. Hooks 44' are provided at the ends of these bands and which are hooked over the drain trough, and these bands are also of elastic material, as in the preceding form. A cord or band 46' is provided at its front end with a hook 49' adapted to engage the sunvisor 50 of the vehicle, and said cord is at its rear end removably attached to the middle of the front ends of the bottom panels 55 and 56, substantially the same as cord 46 is attached to panel 23 in the preceding form. This form of sign is also readily mountable on the vehicle top and readily adjustable thereon, being slidable along these elastic bands 42' laterally of the automobile top to adjust it in the desired position; and this form of my sign is also readily collapsible or foldable to save space for storing or shipping.

These signs are readily and economically constructed, being cut from sheet material, and are readily set up into the desired shape, and may also be readily folded up to be packed away; thus providing a low-cost and efficient sign.

I claim:

1. An advertising sign comprising two elongated advertising sign members secured together, one of said members comprising at least three elongated sections of sheet material hinged together along contiguous edges thereof, whereby the sections may be folded one upon the other in compact form, and whereby they may be arranged to provide a triangular construction in end view, and an elongated flexible holding element adjacent to each end of the device for securing the device upon the top of an automobile or the like.

2. An advertising sign for the top of a vehicle, including a hollow elongated body with open ends having upstanding panel means for receiving advertising matter and bottom panel means thereon to bear on the vehicle top, and securing means adjustably attached to said bottom means for adjustably and removably mounting said sign on said top.

3. An advertising sign for a vehicle top, comprising a collapsible body having elongated panel means foldable together and including panels adapted to bear advertising matter and overlapping bottom panels containing registering openings therein and securing means for readily mounting said sign on said top including flexible band means slidably laced through said openings, whereby to provide a readily collapsible body.

4. An advertising sign for a vehicle top, comprising an elongated body having elongated upstanding panels adapted to receive advertising matter also bottom means thereon to rest on said top, and securing means including elastic band means engaging said bottom means and having hook means thereon for engaging the drain trough on said top to readily mount the sign thereon and to readily remove it therefrom.

5. A sign for a vehicle top, comprising a hollow elongated body consisting of sheet means including hingedly connected elongated upstanding panels also bottom panels hingedly secured thereto to be overlapped and supported on said top, there being registering openings provided in said overlapping panels, securing means for mounting the sign on the top and including bands laced through said openings, thereby providing a body which is readily set up and which is readily collapsed after withdrawing said bands, and means on said bands for readily fastening them to said top.

6. The subject matter of claim 5, and wherein said bands are of elastic material and said fastening means thereon are hooks which are thereby readily hooked onto the drain trough on said top, for easily mounting and snugly holding said sign on said top and for easily removing and collapsing the same.

7. The subject matter of claim 5, and including a cord removably extended through an opening provided in said panels and having a holding element removably attached to its inner end positioned within the body also a hook at its outer end to engage the sunvisor on said top.

8. A sign for a vehicle top, comprising two hollow branches, each consisting of a sheet of material including exposed panels for displaying advertising matter and overlapping bottom panels integral therewith and foldable thereon to be supported on said top, means on said branches for readily connecting them to form a T-shaped body and for again readily disconnecting the same, there being registering openings provided in the bottom panels of one branch and notches in the other branch, and securing means including elastic bands extended through said openings and notches and having means on their ends for engaging means at the edge part of the vehicle top, for conveniently setting-up the sign and securing it in position on the top and for easily removing it and folding the same.

9. The subject matter of claim 8, and including a cord removably attached to the front branch of said casing and having a hook on its forward end to be readily hooked onto the sunvisor on said vehicle top.

FRANK J. O'CONNOR.